Patented Feb. 14, 1939

2,146,897

UNITED STATES PATENT OFFICE 2,146,897

METHOD OF PRODUCING HYDROGENATED ABIETYL ALCOHOL AND PRODUCT

Irvin W. Humphrey, Wilmington, Del., assignor to Hercules Powder Company, Wilmington, Del., a corporation of Delaware No Drawing. Application May 25, 1934, Serial No. 727,443

9 Claims. (Cl. 260—100)

This invention relates to a method for the production of hydrogenated abietyl alcohol or so-called hydrogenated abietol.

Heretofore abietyl alcohol has been produced by dissolving an ester of abietic acid, such, for example, as methyl or ethyl abietate, in a monohydric aliphatic alcohol, as, for example, ethyl or butyl alcohol, heating with metallic sodium then diluting the alkaline solution with water and extracting the abietyl alcohol which has been formed by means of a water immiscible solvent such, for example, as benzene.

While it has heretofore been known to produce abietyl alcohol by the use of metallic sodium, it has not been heretofore known to produce a hydrogenated abietyl alcohol by use of a base metal catalyst and it will be appreciated that such as well as the method for its production is contemplated as a part of this invention.

In proceeding in accordance with the method embodying this invention, either dihydroabietyl alcohol or tetrahydroabietyl alcohol or a mixture of the two may be produced and such may constitute the product of the method. On the other hand, dihydroabietyl alcohol produced in accordance with the method embodying this invention may be hydrogenated by suitable treatment in accordance with the method embodying this invention to tetrahydroabietyl alcohol. The tetrahydroabietyl alcohol product may, however, be produced directly or, in other words, without the intermediate separation of dihydroabietyl alcohol and subsequent hydrogenation.

In accordance with the method of this invention, it has been found that a hydrogenated abietyl alcohol may be produced by treatment of abietic acid as such, or of rosin, or of a suitable abietic acid compound, preferably an ester, with hydrogen under pressure and at an elevated temperature. Desirably, the treatment will be carried out in the presence of a suitable catalytic agent or catalyst. Thus, for example, in accordance with this invention it has been found that dihydroabietyl alcohol may be produced by treatment of abietic acid or a suitable abietic acid compound in the presence of a conversion catalyst and under suitable temperature and pressure conditions above those normally required for the addition of hydrogen to the unsaturated bonds of the abietyl radical of the acid or compound. Further, in accordance with this invention it has been found that hydrogenated abietyl alcohol may be produced by similar treatment of hydrogenated abietic acid or a suitable hydrogenated abietic acid compound, preferably a hydrogenated ester, as, for example, methyl dihydro or tetrahydro abietate, and further that abietyl alcohol may be hydrogenated with the production of a product variously desirable and advantageous for use in the commercial arts.

In the carrying out of the method in accordance with this invention, it will be appreciated that the conversion of the carboxyl group (COOH) of abietic acid to a primary alcohol group is not to be confused with the simple addition of hydrogen to the unsaturated bonds of the abietyl radical, both of which reactions may be involved in this invention.

Thus the addition of hydrogen to an unsaturated bond of the abietyl radical may be shown as follows:

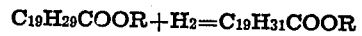

$$C_{19}H_{29}COOR + H_2 = C_{19}H_{31}COOR$$

While conversion of the carboxyl group as effected in accordance with this invention may be shown by the following:

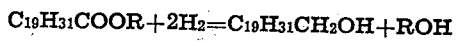

$$C_{19}H_{31}COOR + 2H_2 = C_{19}H_{31}CH_2OH + ROH$$

in which R in the carboxyl grouping may, for example, represent (1) acidic hydrogen as in abietic acid $C_{19}H_{29}COOH$ or (2) an alkyl group as $CH_3$, etc., as in the ester methyl abietate $C_{19}H_{29}COOCH_3$ which results on the neutralization of abietic acid with methanol. Under proper conditions both these reactions will proceed simultaneously. It will be noted that it is essential for the abietyl compound to contain the group COOR. The resin acid may be, for example, abietic, pimaric, pyroabietic, etc., or abietic isomerized by either acid or heat-treatment, or any of the foregoing acids which have been hydrogenated. In event the abietyl compound contains two or three stable COOR groups, it will yield a polyhydric hydrogenated abietyl alcohol.

The dihydroabietyl alcohol formed in accordance with this invention may be hydrogenated for the formation of, for example, tetrahydro abietyl alcohol by treatment with hydrogen under suitable pressure and temperature conditions and in the presence of a base metal hydrogenation catalyst.

Further, in carrying out this invention hydrogenated abietyl alcohol may be produced directly by subjecting hydrogenated abietic acid, or rosin, or a suitable hydrogenated compound of abietic acid, as a hydrogenated ester, to treatment with hydrogen under suitable temperature and pressure conditions and in the presence of a suitable reduction catalyst.

In the practical adaptation of this invention hydrogenated abietyl alcohol may be produced by treatment of abietic acid, rosin, or of a suitable abietic acid or rosin compound as an ester. Thus, for example, in carrying out the method one may use commercial abietic acid, wood or gum rosin, an abietic acid ester such as, for example, methyl abietate, butyl abietate, ethyl abietate, propyl abietate, amyl abietate, etc., etc., a suitable glycol abietate, glycerol abietate, phenyl abietate, etc.

The procedure will, as has been indicated, be carried out under suitable temperature and pressure conditions. Thus, for example, the conversion to hydrogenated abietyl alcohol may be effected through contact with a conversion catalyst and hydrogen at a temperature within say about the range 225–375° C., or preferably within the narrower range about 275–325° C. The hydrogen pressure may, for example, be within the range about 70–500 atmospheres or desirably within the narrower range 100–300 atmospheres.

In carrying out the method various catalysts may be used, as, for example, those employed in methanol synthesis, such as oxides of zinc, cobalt, iron, manganese, magnesium, calcium, barium, molybdenum, nickel, etc., but preferably hydrogenation catalysts as copper chromite, nickel chromite, zinc chromite, etc., will be employed. As will be appreciated, mixtures of the metals, oxides and/or chromites may be used. The catalyst may be reduced separately prior to use or in some instances may be employed without previous reduction, since it may be readily reduced by the hydrogen used under the temperature and pressure conditions employed in effecting the conversion. The catalyst may be used in any suitable form, as, for example, in powdered form, or suitably supported as on kieselguhr, silica gel, etc., where the process is carried out in batch, or it may be in the form of granules of suitable size or in the form of briquettes where the method is carried out as a continuous method. In proceeding in a continuous manner, the abietic acid or compound, as methyl abietate, is preheated and passed over the heated catalyst at a temperature of say 275–350° C. along with hydrogen under about 100–200 atmospheres pressure.

Where it is desired to use a chromite or a mixed chromite as the catalyst, such may be prepared by known methods. Thus, for example, a copper chromite catalyst may be prepared by dissolving 1 mol of ammonium dichromate in one liter of water and then adding sufficient ammonium hydroxide to change the color of the solution from orange to yellow. Two mols of cupric nitrate in one liter of water are then added with stirring, the precipitate separated, thoroughly washed with water, dried and finally calcined until converted into a black powder. The black powder; i. e. copper chromite, may be used as such or, for example, briquetted. It may be pre-reduced with hydrogen before use or it may, for example, be added to the reaction mass without pre-reduction and will be reduced under the conditions provided for the carrying out of the method. Further, for example, a mixed chromite catalyst may be prepared by dissolving one mol of mixed nitrates of copper and zinc in a liter of water, adding a solution containing 100 grams of chromic trioxide and one liter of water, adding 140 grams of 28% ammonium hydroxide, separating the precipitate, as, for example, by filtering, washing, drying and calcining at around 400° C. or higher. The mixed chromite may be used as formed or in any other form, as in the form of granules, briquettes, or suitably supported, as on kieselguhr, silica gel, etc.

As illustrative of the production of dihydroabietyl alcohol, in accordance with the method embodying this invention, for example, 1000 grams of methyl abietate mixed with say about 10% of copper chromite are subjected to a temperature of about 300° C. under a hydrogen pressure of about 1800 pounds per square inch for a period of about 5 hours. The reaction mass will be filtered from the catalyst and will be found to involve a conversion of about 80% of dihydroabietyl alcohol. With the use of higher pressure a higher percentage of conversion will be obtained.

The dihydroabietyl alcohol produced in accordance with the above example may be hydrogenated for the production of tetrahydroabietyl alcohol. Thus, for example, 500 grams of dihydroabietyl alcohol are agitated at a temperature of say about 150–200° C. under a hydrogen pressure of about 1500–5000 pounds or more in the presence of a suitable hydrogenation catalyst, as, for example, nickel powder, for a period of about 1.5 hours. The reaction mass will be filtered from the catalyst and the dihydroabietyl alcohol will be found to have been converted to tetrahydroabietyl alcohol. Dihydroabietyl alcohol may be likewise hydrogenated continuously by passing it over a stationary activated base metal hydrogenation catalyst composed of nickel, nickel chromite, nickel-copper, etc., in the form of briquettes, activated nickel, etc. The surface of the catalyst may be previously activated, for example, by anodic oxidation. In the hydrogenation substantially the same conditions of temperature and pressure are used as are employed for hydrogenation with a nickel powder catalyst as illustrated above.

More specifically, for the hydrogenation of abietyl alcohol, 1000 grams of abietyl alcohol are subjected in a closed vessel, to a temperature of 150–190° C. under a pressure of 1500 pounds per square inch in the presence of hydrogen and of nickel powder catalyst, for a period of say about 2 hours. As a result of the indicated treatment chiefly dihydroabietyl alcohol will be produced, although some tetrahydroabietyl alcohol will be produced, especially if in hydrogenation the pressure is increased.

As illustrative, for example, of the production of dihydroabietyl alcohol, for example, methyl dihydroabietate is admixed with 10% copper chromite and heated with agitation under a hydrogen pressure of about 1500 pounds per square inch, and at a temperature of about 290–310° C. for a period of two hours. The reaction product is then filtered off form the catalyst giving a pale, very viscous near solid. The product will be found to have an acetyl value of about 140 as compared to 0 for the ester, showing a conversion of about 75% to dihydroabietyl alcohol. With the use of the same temperature and a higher pressure, say a pressure of about 2500–3500 pounds, a conversion of say 85–95% will be obtained.

It will be appreciated that hydrogenated abietic acid or rosin may be used in place of the hydrogenated methyl ester used in the above example, though it is preferred to use a hydrogenated ester.

In the production of hydrogenated abietyl alcohol in accordance with this invention, the procedure may involve the treatment of non-hydrogenated rosin, abietic acid esters, etc. Thus, for example, rosin, or an abietic acid ester, such as the methyl, ethyl, etc. esters, may be treated in a closed vessel in the presence of a hydrogenation catalyst, as, for example, nickel, at a temperature of 150–200° C. and under a hydrogen pressure of about 500–5000 pounds or more for a period of about 2 hours. In the period of heating at about 150-200° C. the ester will be hydrogenated, largely to the tetrahydroabietate at the higher pressures, and during the subsequent period of heating at about 300° C. under 100-300 atmospheres with a conversion catalyst as, for example, copper chromite, the hydrogenated ester will be converted into hydrogenated abietyl alcohol.

It will be understood that in accordance with the method embodying this invention abietyl alcohol may be hydrogenated and that in accordance with the method hydrogenated abietyl alcohol may be produced by the treatment of hydrogenated rosin, hydrogenated abietic acid or a hydrogenated abietic acid ester compound with hydrogen and a conversion catalyst under the proper temperature and pressure conditions.

Thus, it will be understood that in accordance with this invention from the broad standpoint, abietyl alcohol may be hydrogenated by treatment with a base metal hydrogenation catalyst or the hydrogenated abietyl alcohol may be produced by reduction of the carboxyl group of a suitable hydrogenated abietyl compound to a primary alcohol group essentially by treatment with hydrogen at an elevated temperature, or both reactions may be made to proceed together. More particularly, the treatment will involve procedure under elevated pressure and desirably in the presence of a catalytic agent or catalyst adapted to reduce a carboxyl group to an alcohol group.

The hydrogenated abietyl alcohol embodying this invention will be found desirable and advantageous for use in the commercial arts. Where the product is produced from rosin, there may be some formation of hydrogenated abietyl abietate by esterification of abietic acid with the alcohol. Thus, for example, hydrogenated abietyl alcohol may be used in protective coatings such as those containing nitrocellulose, also in plastics and synthetic resins. For use it may be desirable to convert the hydrogenated abietyl alcohol into an ester by treating it with the organic acid of the desired ester.

Various esters of either di- or tetrahydroabietyl alcohol may be readily prepared and it will be found that due to the high boiling point of the hydrogenated abietyl alcohols the esters derived from it can be formed by heating the alcohol and acid at a temperature of about 150-250° C. The reaction may be facilitated by adding a volatile hydrocarbon as toluene, xylene, or pinene, etc. to assist in the removal of the water of reaction. Variously, the use of a small amount of an esterification catalyst such as hydrogen chloride, p-toluene sulfonic acid, boric acid, etc., etc., may be found desirable in the preparation of esters. Thus, for example, the dihydroabietate, adipate, maleate, succinate, stearate, palmitate, oleate, abietate, oxalate, esters of abietinol or of hydrogenated abietinol, etc., etc. may be prepared. Hydroabietyl esters of more volatile acids, for example, dibasic organic acids, fatty acids, monobasic acids, acetic propionic, butyric, etc., may be obtained by heating under pressure with or without an esterification catalyst and, as will be understood, anhydrides of acids, as acetic anhydride, aromatic dibasic anhydride, maleic anhydride, terpinene-maleic anhydride, abietic acid-maleic anhydride, etc., may be used in the preparation of the esters.

It will be understood that where in the claims appended hereto the term "carboxyl group" is used, such is intended to include a "modified carboxyl group" or one which has been esterified as equivalent for the normal carboxyl group. Thus, the term is intended to include as equivalents the groups COOH and COOR where R is not hydrogen, as, for example, in the use of an ester, as methyl abietate.

This application is a continuation in part of application Serial No. 604,859, filed April 12, 1932, by Irvin W. Humphrey.

No claim is made in this application to the esters of the hydrogenated abietyl alcohols disclosed herein as such form the subject matter of a copending application, Serial No. 687,481, filed August 30, 1933.

What I claim and desire to protect by Letters Patent is:

1. The method of forming a tetrahydro resin alcohol which comprises forming a dihydro resin alcohol by carboxylic reduction of a natural resin acid with hydrogen and treating the dihydro resin alcohol at an elevated temperature with hydrogen under superatmospheric pressure in the presence of a hydrogenation catalyst.

2. The method of forming a tetrahydro resin alcohol which comprises forming a dihydro resin alcohol by the carboxylic reduction of a natural resin acid with hydrogen and treating the dihydro resin alcohol at a temperature within the range of about 150° C. to about 200° C. with hydrogen under a pressure of about 1500 to about 5000 lbs. per sq. in. in the presence of a suitable hydrogenation catalyst.

3. The method of forming a tetrahydro resin alcohol which comprises forming a dihydro resin alcohol by the carboxylic reduction of a natural resin acid with hydrogen in the presence of a suitable hydrogenation catalyst and treating the dihydro resin alcohol at a temperature within the range of about 150° C. to about 200° C. with hydrogen under a pressure of about 1500 to about 5000 lbs. per sq. in. in the presence of a metallic nickel hydrogenation catalyst.

4. The method of forming a tetrahydro resin alcohol which comprises forming a dihydro resin alcohol by carboxylic reduction of abietic acid with hydrogen and treating the dihydroabietyl alcohol at an elevated temperature with hydrogen under superatmospheric pressure in the presence of a hydrogenation catalyst.

5. The method of forming a tetrahydro resin alcohol which comprises forming a dihydro resin alcohol by the carboxylic reduction of abietic acid with hydrogen and treating the dihydro abietyl alcohol at a temperature within the range of about 150° C. to about 200° C. with hydrogen under a pressure of about 1500 to about 5000 lbs. per sq. in. in the presence of a suitable hydrogenation catalyst.

6. The method of forming a tetrahydro resin alcohol which comprising forming a dihydro resin alcohol by carboxylic reduction of pimaric acid with hydrogen and treating the dihydropimaryl alcohol at an elevated temperature with hydrogen under superatmospheric pressure in the presence of a hydrogenation catalyst.

7. The compound comprising a tetrahydro resin alcohol.

8. The compound tetrahydroabietyl alcohol.

9. The compound tetrahydropimaryl alcohol.

IRVIN W. HUMPHREY.